Patented May 27, 1947

2,421,108

UNITED STATES PATENT OFFICE 2,421,108

PROCESS FOR TREATING LATEX

Clarence Walter Wilson, Norco, Calif., assignor to California Fruit Growers Exchange, Los Angeles, Calif., a corporation of California No Drawing. Application October 6, 1944,
Serial No. 557,561

7 Claims. (Cl. 260—822)

This invention relates to the processing of rubber latex for the purpose of preparing it in better condition for certain uses, such as those involving form dipping, extrusion of soft sealing gaskets, and similar uses. It also relates to the products of such processes.

In the last few years, due to improved methods of preservation and transportation, latex has become of very great importance for many applications, some of which had previously been served by so-called rubber solutions. This substitution of latex for rubber solutions was desired for a long time since the rubber solutions had numerous disadvantages in their industrial applications. Certain of these disadvantages were the unavoidably high viscosity of a solution of comparatively low rubber content, the fire and health hazards inherent in the types of solvent which were necessarily used, and the expenses occasioned by the handling and the inevitable losses of volatile organic liquids. As against these disadvantages, latex, being an emulsion, may be obtained in vastly higher rubber solids concentration for a given viscosity, or conversely, an equal amount of rubber solids may be employed in a liquid of considerably less viscosity than a solution containing approximately the same rubber solids. Furthermore water is substantially the cheapest solvent known to industry, and no hazards are presented in its use. Even where it is desired to use a latex which has been thickened so that its viscosity increases enough to approach that of a solution of similar rubber content, there still remain advantages in favor of the latex.

Latex, as obtained from the plantation, generally has a rubber content of from about 32% to 36% and for certain uses must be concentrated. That is, a certain portion of the serum must be removed from the latex, giving a concentrated latex containing a greater percentage of rubber. Latex is, further, often so concentrated for purpose of shipment from the plantation to the place where it is to be used. In many uses, however, the actual rubber content of the latex need not be high but the physical characteristics of the latex must, for practical reasons, correspond to those of a thick, viscous solution, or even a more or less solid paste. In these uses the latex still retains the hygienic, safety, and solvent cost advantages over rubber solutions of similar properties. Increase in viscosity may be obtained by thickening the latex without at the same time increasing the rubber concentration. Thickening may be accomplished by the use of many different types of compositions, and numerous processes for thickening latex have been suggested. The known thickeners include such substances as heavy metal salts, polysaccharides, albuminoids, colloidal clays, casein, glue, soluble silicates, et cetera. Indeed it has been suggested that pectin bodies may be used for this purpose, though not in the manner I have found to be eminently satisfactory.

I have discovered a new process involving the use of pectin for thickening latex. I have found that pectin used according to my process as disclosed hereinafter, is a very efficacious agent for this purpose. The pectin may be used in rather widely varying amounts, greater quantities causing of course greater body and viscosity in latices of a given solids content; while lesser amounts, conversely, under otherwise corresponding conditions give less increase in body and viscosity.

One example of the use of latex is in the common dipping method wherein forms of different materials and of various and perhaps complicated shapes are introduced into a latex solution and subsequently withdrawn, retaining an adherent coating of latex in greater or less thickness. For most articles so produced it is quite undesirable for the latex to run down the form, thus producing a coating of variable thickness, or to drip from the form unduly after it is withdrawn from the solution. Clearly, thin, watery latex will tend to give more trouble of this kind than will more viscous solutions. And yet a latex of a rubber content that is not too high may be required, in order that too thick a layer of rubber shall not be deposited upon the form.

By thickening latex with pectin according to my process I am able to give to the latex a thixotropic character. Having this character, the latex is fluid so long as it is agitated. The agitation may be that, for example, which is caused by the introduction and withdrawal of a form. As quickly as this agitation ceases, however, the thixotropic character of the latex will cause it to set again to a more or less weak gel, and thus it will not continue to run down the form.

Other processes wherein thickened latices are useful are those involving waterproofing fabrics, producing sheet rubber by the employment of rolls dipping into latex solutions, and extrusion of semi-solid rubber gaskets as, for example, in can sealing.

It is an object of my invention to provide a process for thickening latex by the use of pectin.

A further object of my invention is to provide a process for rendering latex suitable for use in dipping, spreading, molding, extruding, coating, and like processes.

Another object is to produce a stable, thickened latex liquid or paste.

A still further object of my invention is to provide a process for using pectin for thickening natural or concentrated latices.

Another and further object is to provide a preparation comprising pectin and suitable for use in thickening latex.

Another object is to provide a latex product of proper body and other physical characteristics for use in can sealing compounds.

Other objects and advantages of my invention not particularized herein will be apparent to those skilled in this art. While I do not wish to limit myself to the specific proportions and operations set forth for the purpose of example only, I give below a number of specific practical directions for the use of my invention.

Pectin as usually marketed commercially is put up for use in making sugar jellies and with this purpose in mind it is standardized with corn sugar or other material to a definite jelly grade. I find that the jelly grade of the pectin is substantially uncorrelated with its value for use in my process. Therefore, since these extraneous materials have no function when the pectin is used for thickening latex, I prefer to use pectin which has not been thus standardized. Such pectin may be used for thickening latex according to the following formula:

| | | |
|---|---|---|
| Pectin | pounds | 3 |
| Calcium acetate.2H$_2$O | do | 1 |
| Water | gallons | 12.5 |

The calcium acetate is first mixed with the dry pectin and the dry mixture added to water with rapid stirring. This procedure aids in dispersion of the pectin, which will be complete after a short time of standing with further occasional stirring. This solution is now added to alkaline latex, which may be natural latex, concentrated latex, synthetic latex, latex cream, vulcanized latex, or emulsions of rubber-like substances. Enough of the solution is added to the latex to provide the equivalent of approximately 0.25% dry pectin therein. The so-treated latex will thicken within a period of a few hours to a more or less stiff paste, depending on the concentration of rubber solids in the latex, and possibly on other materials which have been compounded with the latex. The amount of preservative, such as ammonia or caustic soda, will also influence the rate of thickening and the final characteristics of the product, definite alkalinity being necessary for carrying on my thickening procedure. High amounts of alkalies such as ammonia and caustic soda, giving a high alkalinity, will of course increase the rate of thickening. Latex thickened in accordance with this specific disclosure may be used for, among other purposes, production of rubber goods by dipping thereinto of forms.

Another specific process which I have followed for preparing thickened latex involves the use of a mixture of 100 parts of unstandardized pectin with 30 parts of finely ground crystalline calcium acetate. The mixture is dissolved in about 30 times its weight of water, and is added to the latex in such an amount as to supply the equivalent of 0.5% dry pectin to the latex. After several hours setting at approximately room temperature, the thickened latex is obtained as a semi-solid mass which is smooth and uncoagulated. This mass should be stirred for a short time shortly before use. This particular product is especially useful for making thick rubber sheet material.

I have also produced a thickened latex which is quite suitable as a can-sealing compound. Pectin is mixed with about one-half its weight of calcium citrate. This powdered mixture is introduced into water to produce approximately a 5% pectin sol and sufficient of this sol is added to the latex, which may be either ammonia or caustic soda preserved, so as to supply to the latex the equivalent of about 0.25% of dry pectin. Thickening takes place slowly so that there is ample time to mix and compound the product with other constituents ordinarily used in can sealing compositions such as aluminum oxide, diatomaceous earth, zinc oxide, and other fillers. The thixotropic character imparted by the addition of pectin is of particular value in this use, as because of it the latex will flow freely from the nozzle of the machine but will not continue to flow after being deposited.

The thickness, viscosity, total solids content, and other properties of the product may be varied by numerous changes in the proportions which I have specifically disclosed herein as exemplary of my invention. The quantity of pectin used to thicken a latex of a given solids content may be varied within a wide range. In certain cases it will be useful to use the pectin in sufficient quantity to cause actual gelation of the latex. In this connection one will, of course, always bear in mind not only the well known fact that pectin is itself acidic in character but also the fact, as pointed out above, that the amount of ammonia, caustic soda, or the like, i. e., the alkalinity influences the rate of thickening and a definite alkalinity is necessary for carrying on my procedure.

The results of variations in added pectin will be proportional variations in the various physical characteristics of the liquid or paste product. As pointed out just above, these variations may be over a wide range and since, as pointed out below, the operation of my invention depends upon reacting the added pectin with metallic ions to produce an insoluble precipitate which as it forms brings about the gel formation throughout the latex, it will be obvious to those skilled in handling pectin substances and possessing a knowledge of their reactions that there will be no sharp or critical change in the behavior of the pectin over the range within which it may be added, but only a gradual, proportional change from a stiff gel, referred to above as actual gelation, when high amounts are used to a weaker gel of thixotropic character when proportions of the order specifically given herein are used, on down—with lesser quantities—to a gel which, while actually still thixotropic in character when exteriorly supported, as by a container, is too weak to itself support the fluid it embraces and thus retard the flow thereof, and hence is of little use for my purposes.

My process may be applied to the numerous types of latex used in industry, according to the particular purpose for which the product is intended. Latex thickened according to disclosures herein made is capable of existing for long periods of time without undesirable effects, such as coagulation.

While, in the specific examples given above, only two calcium salts have been mentioned, it is to be understood that the particular salts mentioned in the examples are not specific to the particular uses illustrated, and, moreover, it is to be noted that any soluble calcium salt will be found to be suitable for thickening latex. I have successfully used calcium sulfate, and I intend to include in my disclosure salts of substantially equal or greater solubility. In this connection, and particularly with regard to the desirability of avoiding undesirable effects such as coagulation, I would call attention to the known fact reported in the literature that in dealing with the addition of metal salts to alkaline latex it is the cation which is of critical effect. Hence, common calcium salts in general may be regarded as satisfactory, provided of course that they are more soluble than the corresponding pectates or pectinates, which latter would otherwise not be formed. Furthermore, other soluble alkaline earth salts (strontium, barium) may be used, as may be soluble salts of the heavy metals. Though not ruled out by failure to thicken latex, salts of metals which adversely affect the properties of rubber (e. g., copper) will obviously not ordinarily be used.

The operation of my invention depends on getting into solution with the pectin a sufficient quantity of a metallic ion to react with the pectin to form an insoluble pectinate or pectate, as the pectin is reacting with the alkaline latex preservative. The alkali slowly hydrolyzes the pectin, whereupon the metallic ion is enabled to add itself to the pectin molecule, thus producing an insoluble compound which tends to form as a gelatinous precipitate. Precipitation is, however, restrained and the final effect of the reaction is to considerably increase the viscosity of the entire system. The gelatinous precipitate, to the extent that it is formed, will, of course, be coextensive with the body of latex.

In the subjoined claims I intend the term latex to include natural latex, concentrated latex, synthetic latex, latex cream, vulcanized latex, and emulsions of rubber-like substances. If the latex is not alkaline I may add alkali in amounts generally equivalent to those used for preservative purposes.

This application is a continuation-in-part of my co-pending application, Serial No. 414,383, filed October 9, 1941.

Having disclosed my invention in accordance with the statutes, I claim:

1. A process for converting fluid alkaline latex to a thixotropic gel which comprises adding to the alkaline latex a pectin sol and an alkaline earth compound having a solubility in water at least substantially equal to that of calcium sulfate and forming in the latex, by reaction within the body of the latex between the alkali hydrolyzed pectin and the alkaline earth compound, a gelatinous precipitate constituting a thixotropic gel coextensive with the body of the latex.

2. A process for converting fluid alkaline latex to a thixotropic gel which comprises adding to the alkaline latex a pectin sol and a calcium compound having a solubility in water at least substantially equal to that of calcium sulfate and forming in the latex, by reaction within the body of the latex between the alkali hydrolyzed pectin and the calcium compound, a gelatinous precipitate constituting a thixotropic gel coextensive with the body of the latex.

3. A process for converting fluid alkaline latex to a thixotropic gel which comprises adding to the alkaline latex a pectin sol and a barium compound having a solubility in water at least substantially equal to that of calcium sulfate and forming in the latex, by reaction within the body of the latex between the alkali hydrolyzed pectin and the barium compound, a gelatinous precipitate constituting a thixotropic gel coextensive with the body of the latex.

4. A process for converting fluid alkaline latex to a thixotropic gel which comprises adding to the alkaline latex a pectin sol and a strontium compound having a solubility in water at least substantially equal to that of calcium sulfate and forming in the latex, by reaction within the body of the latex between the alkali hydrolyzed pectin and the strontium compound, a gelatinous precipitate constituting a thixotropic gel coextensive with the body of the latex.

5. A process for converting fluid alkaline latex to a thixotropic gel which comprises adding to the alkaline latex from 5% to 30% of an aqueous medium containing about 3% of pectin and 1% of a calcium salt having a solubility in water at least substantially equal to that of calcium sulfate and forming in the latex, by reaction within the body of the latex between the alkali hydrolyzed pectin and the calcium salt, a gelatinous precipitate constituting a thixotropic gel coextensive with the body of the latex.

6. A process for converting fluid alkaline latex to a thixotropic gel which comprises adding to the alkaline latex from 5% to 30% of an aqueous medium containing about 3% of pectin and 1% of a calcium compound having a solubility in water at least substantially equal to that of calcium sulfate and forming in the latex, by reaction within the body of the latex between the alkali hydrolyzed pectin and the calcium compound, a gelatinous precipitate constituting a thixotropic gel coextensive with the body of the latex.

7. A process for thickening a fluid alkaline latex which comprises mixing with the alkaline latex a pectin sol and calcium citrate in such proportions as to supply to the latex the equivalent of about 0.25% of dry pectin and about 0.12% of calcium citrate, and forming in the latex, by alkaline hydrolysis of the pectin and subsequent reaction of the hydrolyzed pectin with the calcium citrate, a gelatinous precipitate constituting a thixotropic gel co-extensive with the body of the latex.

CLARENCE WALTER WILSON.

REFERENCES CITED

The following references are of record in the file of this patent:

UNITED STATES PATENTS

| Number | Name | Date |
| --- | --- | --- |
| Re. 21,077 | Wilson | May 9, 1939 |
| 2,041,712 | Hiers | May 26, 1936 |
| 2,132,064 | Wilson | Oct. 4, 1938 |
| 2,312,577 | Olsen | Oct. 11, 1938 |

OTHER REFERENCES

Industrial and Engineering Chemistry, vol. 33 of 1941, pages 287 to 291, inc.

Rubber Chemistry and Technology, vol. 11 of 1938, pages 608 to 623, inc.